Patented Jan. 9, 1923.

1,441,417

UNITED STATES PATENT OFFICE.

DAVID F. GOULD, OF CORNWELLS, PENNSYLVANIA, ASSIGNOR TO THE BARRETT COMPANY, A CORPORATION OF NEW JERSEY.

PURIFICATION OF HYDROCARBONS.

No Drawing. Application filed February 5, 1921. Serial No. 442,821.

*To all whom it may concern:*

Be it known that I, DAVID F. GOULD, a citizen of the United States, residing at Cornwells, in the county of Bucks and State of Pennsylvania, have invented certain new and useful Improvements in the Purification of Hydrocarbons, of which the following is a specification.

My invention relates to the process of purifying hydrocarbons, such as naphthalene, fluorene, acenaphthene, etc. In the purification of these hydrocarbons as generally practiced, the impure mass or batch containing the hydrocarbon that is to be purified and a considerable amount of unsaturated or readily attacked impurities is agitated in a molten condition with sulfuric acid which attacks these impurities. The sulfuric acid is then removed, after which the molten material is washed with water to remove the excess acid and other water soluble compounds and is then often washed with an alkali and subsequently distilled.

I have found that the sulfuric acid treatment forms compounds, such as sulfonic acids, which dissolve in the hydrocarbon that it is desired to purify and are not readily removed by the subsequent washing with water or alkali. On distillation, these compounds break up to some extent, giving rise to impurities in the final refined material.

These impurities in the refined material may be detected by the "wash test" which consists of dissolving the hydrocarbon in pure benzol or other suitable solvent and shaking the cold solution with sulfuric acid, whereby, if these impurities are present, the sulfuric acid is colored an orange color, varying in depth with the quantity of these impurities present.

I have found that if the hydrocarbon be allowed to crystallize after the washing treatment with sulfuric acid or other washing agent, the impurities tend to separate on the surface of the crystals and, on washing the crushed or otherwise obtained finely crystalline mass with water or alkali, are more readily removed than by the ordinary process of washing in liquid state. The crystallization may or may not be preceded by a hot water washing of the molten material to remove the bulk of the acid and other soluble impurities.

The crystallization above referred to may be effected by running the molten material after the sulfuric acid treatment into pans, allowing it to cool and solidify, and subsequently digging it out of the pans and crushing it. The crystallization may also be effected by agitating the molten material with water at substantially the same temperature and gradually cooling until crystallization is effected, as described in my copending application Serial No. 430,988, filed Dec. 15, 1920, in which case the process of crystallizing furnishes a water wash in itself. It may also be effected in other ways, the particular method of crystallization not being essential to my process.

In practicing this invention, while I do not wish to limit myself to the exact procedure described below, nor to the use of sulfuric acid as the primary washing agent, nor to the particular hydrocarbon mentioned, the following may serve as an example to illustrate the invention and make it clearly understood:

10,000 pounds of impure molten naphthalene are agitated at a temperature of about 85° C. with 300 pounds of 66° Bé. sulfuric acid. The mixture is allowed to settle and the acid is drawn off. The naphthalene may then be run into a shallow pan and allowed to solidfy. It is taken out, crushed, and the crushed material washed by agitation at a temperature of about 25° C. with 1200 gallons of water containing about 50 pounds of caustic soda in solution. The slurry is run to centrifuges and the water removed by whizzing. The naphthalene is washed in the centrifuge with a small quantity of water. The washed material may then be distilled to increase its purity.

The principal advantage which I claim for my invention is the improvement in the quality of refined product which it produces. This improvement is shown both by a higher melting point and by a lighter "wash test."

While not intending to commit myself to any definite theory upon which to explain what takes place while performing the process of this invention, I wish to state that judging from some of the results that have been obtained, there seems to be a polymerization of some of the impurities which enables them to be more readily separated or washed from the hydrocarbon which it is desired to purify. The benefit appears to be obtained by the usual polymerizing agencies for organic compounds such as treatment with sulfuric acid or aluminum chloride or by a heat treatment under high pressure. In addition to apparent polymerization of impurities, some of the impurities may also be otherwise changed during the treatment with the washing agent. For example, washing with sulfuric acid produces some sulfonation whereby sulfonic acids are produced which can be more readily removed by the water wash than the original impurities, which consist for the most part of organic compounds. What I desire to emphasize is that after the treatment or washing of the material I am enabled to obtain a crystallization which throws out the impurities, thus rendering it easy to remove the same and leave a purified product.

It is to be understood that the washing agent may be added while the material to be purified is cold, or the material may first be heated to melt the hydrocarbon and the washing agent then added.

I claim:

1. The steps in the process of purifying hydrocarbons which consist in washing the molten hydrocarbon, crystallizing the hydrocarbon and washing the crystals.

2. The steps in the process of purifying hydrocarbons which consist in washing the molten hydrocarbon with sulfuric acid, crystallizing the hydrocarbon and washing the crystals.

3. The steps in the process of purifying hydrocarbons which consist in washing the molten hydrocarbon with sulfuric acid, crystallizing the hydrocarbon and washing the crystals with an aqueous liquid.

4. The steps in the process of purifying hydrocarbons which consist in washing the molten hydrocarbon with sulfuric acid, drawing off the spent acid, crystallizing the hydrocarbon and washing the crystals.

5. The steps in the process of purifying hydrocarbons which consist in washing the molten hydrocarbon with sulfuric acid, drawing off the spent acid, crystallizing the hydrocarbon and washing the crystals with an aqueous liquid.

6. The steps in the process of purifying hydrocarbons which consist in washing the molten hydrocarbon with sulfuric acid, drawing off the spent acid, crystallizing the hydrocarbon and washing the crystals with water.

7. The steps in the process of purifying naphthalene which consist in washing the molten naphthalene with sulfuric acid, drawing off the spent acid, crystallizing the naphthalene and washing the crystals with water.

8. The process of purifying hydrocarbons which comprises treating material which contains the hydrocarbon to be purified and impurities at such a temperature that said hydrocarbon becomes liquid, so as to render some of the impurities capable of being removed by washing, crystallizing the hydrocarbon and washing the crystals.

9. The process of purifying naphthalene which comprises treating a mixture containing naphthalene with sulfuric acid at a temperature above the melting point of naphthalene, crystallizing the naphthalene and washing the crystals.

10. The process which comprises agitating impure molten naphthalene with concentrated sulfuric acid, drawing off the acid, cooling, permitting the naphthalene to solidify, comminuting the solid mass and washing it.

11. The process which comprises agitating impure naphthalene at 85° C. with approximately 3% by weight of near 66° Bé. sulfuric acid, drawing off the spent acid, permitting the naphthalene to solidify by cooling, crushing and washing it with water and caustic soda at a temperature of about 25° C.

12. The step in the purification of naphthalene which comprises permitting the naphthalene to crystallize after a sulfuric acid treatment at a temperature above its melting point and before a water wash.

In testimony whereof I affix my signature.

DAVID F. GOULD.